United States Patent
Zeilenga et al.

(10) Patent No.: US 10,422,402 B2
(45) Date of Patent: Sep. 24, 2019

(54) DAMPER ASSEMBLY

(71) Applicant: Illinois Tool Works Inc., Glenview, IL (US)

(72) Inventors: Chad K. Zeilenga, Crete, IL (US); David A. Doornbos, Woodstock, GA (US); Steven L. Bivens, Kankakee, IL (US); Jeffery S. Cascio, Tinley Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 1123 days.

(21) Appl. No.: 14/475,959

(22) Filed: Sep. 3, 2014

(65) Prior Publication Data

US 2014/0367890 A1 Dec. 18, 2014

Related U.S. Application Data

(63) Continuation of application No. 13/056,694, filed as application No. PCT/US2009/049512 on Jul. 2, 2009, now Pat. No. 8,925,696.

(Continued)

(51) Int. Cl.
*B29C 43/02* (2006.01)
*F16F 9/12* (2006.01)
*F16F 7/00* (2006.01)
*F16F 1/10* (2006.01)
*F16F 9/54* (2006.01)
*E05F 3/14* (2006.01)
*B29K 67/00* (2006.01)

(Continued)

(52) U.S. Cl.
CPC ............... *F16F 9/12* (2013.01); *B29C 43/02* (2013.01); *F16F 1/10* (2013.01); *F16F 7/00* (2013.01); *B29K 2067/00* (2013.01); *B29K 2105/253* (2013.01); *B29L 2031/721* (2013.01); *E05F 3/14* (2013.01); *E05Y 2201/21* (2013.01); *E05Y 2201/254* (2013.01); *E05Y 2201/266* (2013.01); *E05Y 2900/538* (2013.01); *F16F 9/54* (2013.01); *Y10T 16/293* (2015.01)

(58) Field of Classification Search
CPC ........ F16F 9/12; F16F 9/54; F16F 1/10; F16F 7/00; B29C 43/02; Y10T 16/293; B29L 2031/721; B29K 2105/253; B29K 2067/00; E05F 3/14; E05Y 2201/21; E05Y 2201/254; E05Y 2201/266; E05Y 2900/538

See application file for complete search history.

(56) References Cited

U.S. PATENT DOCUMENTS 4,136,866 A * 1/1979 Bouvier .................. A63B 5/20
16/430
5,516,177 A * 5/1996 Levely ...................... B60R 7/06
16/85

(Continued)

FOREIGN PATENT DOCUMENTS

GB 2350876 A * 12/2000 ............ F16F 9/0218

OTHER PUBLICATIONS http://www.alllinerope.com/index.php/product/item/104-solid-braid-mfp.*

*Primary Examiner* — Joseph S Del Sole
*Assistant Examiner* — Ninh Le
(74) *Attorney, Agent, or Firm* — Quarles & Brady LLP

(57) ABSTRACT

A tether for attachment to a damper device is formed to include a heated, reshaped enlarged bulbous end.

12 Claims, 4 Drawing Sheets

Related U.S. Application Data

(60) Provisional application No. 61/086,855, filed on Aug. 7, 2008.

(51) Int. Cl.
*B29K 105/00* (2006.01)
*B29L 31/00* (2006.01)

(56) References Cited

U.S. PATENT DOCUMENTS

| | | | | |
|---|---|---|---|---|
| 5,861,200 A * | 1/1999 | Rowley | ............... | B29C 57/00 |
| | | | | 138/137 |
| 5,920,922 A * | 7/1999 | Ragsdale | ............... | E04H 4/101 |
| | | | | 4/498 |
| 6,345,416 B1 * | 2/2002 | Vollmar | ............... | E05B 85/10 |
| | | | | 16/24 |
| 6,361,842 B1 * | 3/2002 | Stachowiak | ............... | B29C 57/00 |
| | | | | 264/209.1 |
| 6,467,713 B1 | 10/2002 | Watanabe et al. | | |
| 2004/0139583 A1 * | 7/2004 | Wendle | ............... | B65D 63/1027 |
| | | | | 24/16 PB |
| 2007/0108676 A1 * | 5/2007 | Zeilenga | ............... | E05F 5/00 |
| | | | | 267/69 |

\* cited by examiner

DAMPER ASSEMBLY

CROSS-REFERENCE TO RELATED APPLICATIONS

The present application is a continuation of U.S. patent application Ser. No. 13/056,694 filed Jan. 31, 2011, which is a 371 of PCT/US09/049512 filed Jul. 2, 2009, which claims the benefits of U.S. Provisional Application Ser. No. 61/086,855 filed Aug. 7, 2008.

FIELD OF THE INVENTION

The present invention relates generally to dampers for controlling movement of things, and, more particularly, the invention pertains to viscous dampers that use a tether for attachment between the device to be controlled and the damper.

BACKGROUND OF THE INVENTION

It is known to use movement dampers in a wide variety of assemblies to control the movement of assembly components. In some situations, dampers are used to control movements of components that would otherwise move more suddenly and forcefully than desired. The damper may control movement caused by gravitational forces or movement induced by springs or other actuators. Doors, drawers and pullouts in furniture are known applications for dampers. In automobiles, dampers are known for use on glove box doors, console covers, sunglass bins, retractable cup holders and other storage bins or storage areas.

Various types of dampers are known, including different types of both one-way and two-way dampers. As the names imply, a one-way damper controls movement in only one direction while applying minimal resistance to movement in a return direction, and a two-way damper provides resistance or control of movement in both directions.

Viscous dampers are known. In a viscous damper a rotor is rotatable within a housing that contains a viscous damping fluid. Internal structures of the rotor and/or housing establish ports for relative movement of the damping fluid and rotor, thereby providing a desired degree of resistance or "damping".

The various damper types have worked effectively in many applications. However, there are ever increasing demands necessitating new and improved damper designs. For example, in automobiles space is at a premium. It is desirable to maximize interior passenger space as well as storage space. Accordingly, it is desirable that dampers be small or operate within areas that do not detract from otherwise usable cabin space.

Some prior damping systems, especially pneumatic dampers, do not start smoothly. The damping performance may begin some time after movement has started. In some situations it is desirable for damping to begin immediately without delay. With dampers used in more frequent applications, including vehicle interiors and other confined spaces, noise from an operating damper can be objectionable. Accordingly, it is desirable to reduce noise that may occur from the operating damper.

SUMMARY OF THE INVENTION

The present invention provides a viscous damper moveable along a path and fastened by a tether to the item the movement of which is being controlled. A constant force spring influences movement of the damper along the path. The tether is constructed of heat-softenable and re-formable material, and ends of the tether are reshaped into bulbous enlargements for connecting the tether within an assembly.

In one aspect of one form thereof, the present invention provides a damper assembly with a fixed base having a rack gear, a carriage movable relative to the base, and a rotary damper carried by the carriage. The damper has a damper gear engaged with and movable along the rack gear. A tether is connected for movement with movement of the damper relative to the rack gear, and a constant force spring is connected between the base and the carriage, the constant force spring having an end fixed in position relative to the rack gear.

In another aspect of another form thereof, the present invention provides a damper assembly with a fixed rack gear; a carriage movable relative to the rack gear; a rotary damper carried by the carriage, the damper having a damper gear engaged with the rack gear; and a tether connected to the carriage, the tether including an enlarged end of reshaped tether material.

In a further aspect of a further form thereof, the present invention provides a damper assembly with a fixed track; a fixed rack gear; a carriage having a follower slidingly engaged with the track; a rotary damper having a damper gear engaged with the rack gear, the damper being movable with the carriage; a tether connected to the carriage at one end and having a second end attachable to a movable object to be controlled by the damper assembly; and a constant force spring operably connected relative to the carriage and the track.

An advantage of one aspect of the damper disclosed herein is providing a damper that operates smoothly and with reduced rattle or chatter even when build variation results in a tighter or looser assembly.

Another advantage of another aspect of the damper disclosed herein is providing a damper system that can be used with different types of dampers, including both one-way and two-way dampers, and that has strong tether connections that are secure.

A further advantage of a further aspect of the damper disclosed herein is providing a damper assembly that can be manufactured and assembled efficiently.

Other features and advantages will become apparent to those skilled in the art upon review of the following detailed description, claims and drawings in which like numerals are used to designate like features.

Figure 1:
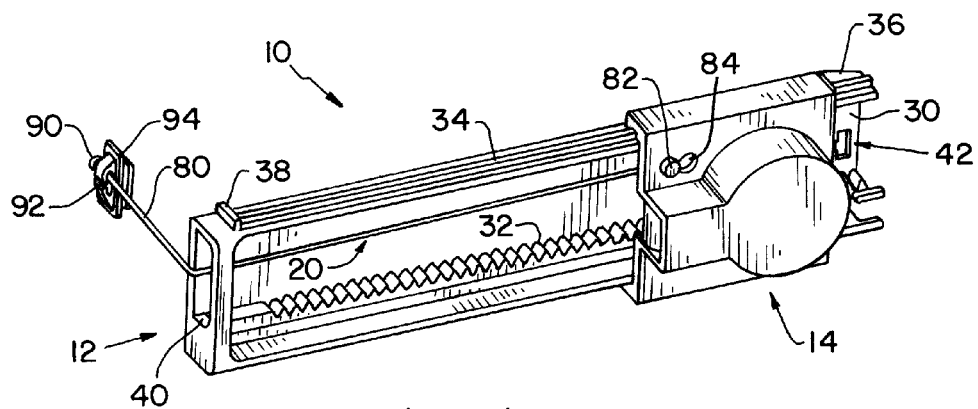
FIG. 1 is a perspective view of a viscous strand damper assembly in a retracted position.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 2:
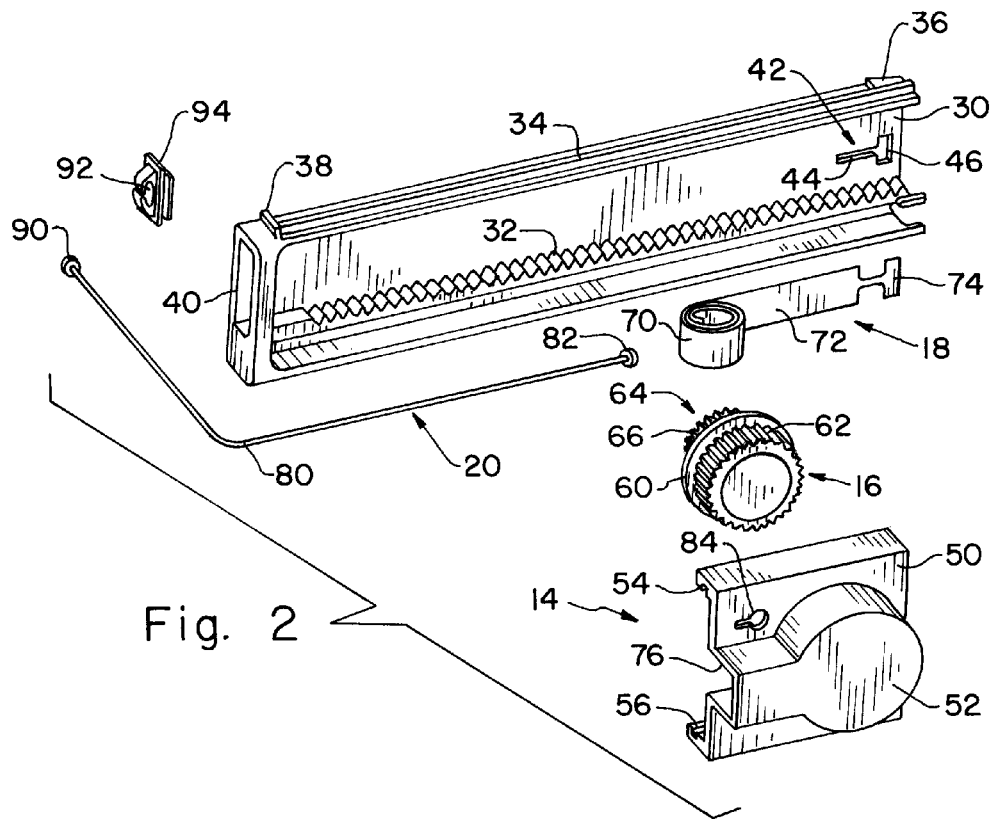
FIG. 2 is an exploded view of the viscous strand damper assembly.
Figure 3:
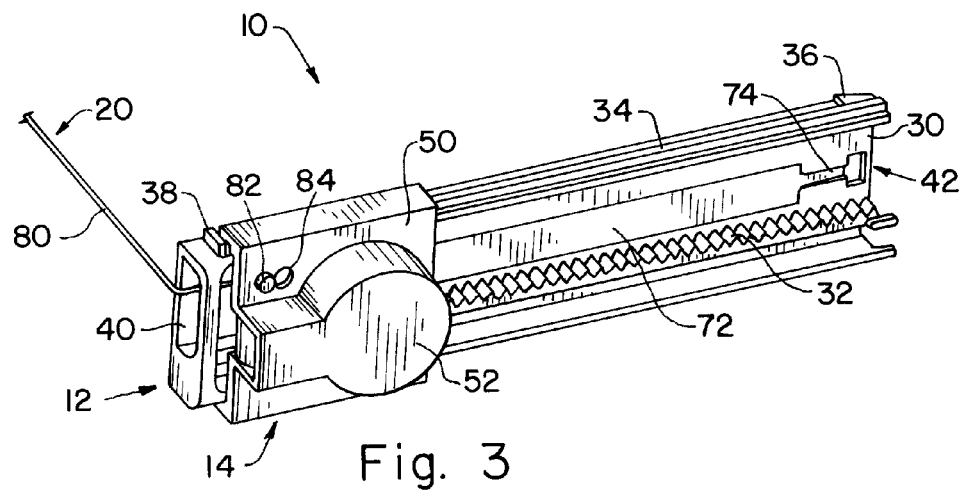
FIG. 3 is a perspective view similar to that of FIG. 1, but illustrating the damper assembly in an extended position
Figure 4:
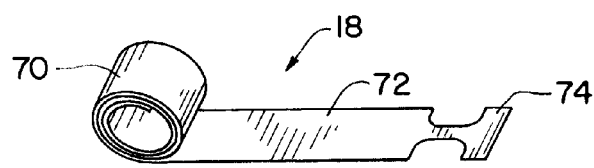
FIG. 4 is a perspective view of a constant force spring used in the damper assembly.
Figure 5:
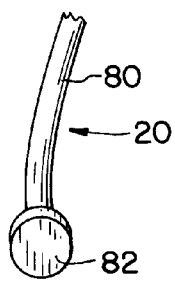
FIG. 5 is a fragmentary view of one end of a tether in the damper assembly.
Figure 6:
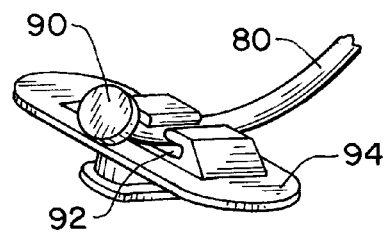
FIG. 6 is a perspective view of an end of the tether secured in a retention clip.

Referring now more specifically to the drawings and to FIGS. 1 and 2 in particular, numeral 10 designates a viscous strand damper assembly that includes a base 12 by which damper assembly 10 is positioned and mounted for use. A carriage 14 is engaged with base 12, and moves back and forth along base 12 via the interrelationship of a damper 16 carried within carriage 14 and operable along base 12 and a slidable connection between base 12 and carriage 14. A spring 18 is provided for moving carriage 14 in one direction. A tether 20 is connected to carriage 14 at one end thereof and to the item to be controlled at another end thereof.

Base 12 includes a base plate 30 for mounting assembly 10 in the vicinity of the article the movement of which is to be controlled. Accordingly, base plate 30 can be provided with suitable structures (not shown) such as holes for fasteners, integral snap connectors, an adhesive backing or the like by which fastening of base plate 30 to another object can be achieved. Base 12 defines a rack gear 32 for engaging damper 16. Rack gear 32 extends from near one end of base 12 to near the opposite end of base 12. A track 34 along one edge of base plate 30 is provided for engaging carriage 14 and includes stops 36 and 38 at opposite ends of track 34. In the exemplary embodiment, track 34 is a ridge on an outer edge of base plate 30. At one end thereof, base 12 defines a guide slot 40 for guiding and directing tether 20. At an opposite end, base 12 defines spring mount 42 to hold an end of spring 18. In the exemplary embodiment shown, spring mount 42 is a T-shaped slot having a longitudinal slot segment 44 and a transverse slot segment 46 defined in base plate 30 and intersecting with each other. T-shaped spring mount 42 is configured to hold an end of spring 18 via an end configuration of spring 18 to be described.

Carriage 14 is shaped to contain damper 16 and operate therewith while engaging base 12 and traversing along base 12 in a sliding relationship. Accordingly, carriage 14 includes a main body 50 having a well 52 for receiving and holding damper 16. Well 52 is a hollow depression or pocket for receiving damper 16 therein. A first follower 54 on a first edge of body 50 rides along track 34 of base 12, and, in the exemplary embodiment, includes a slot for receiving and following the ridge of the exemplary track 34. A second follower 56 on an edge of body 50 opposite the edge having follower 54 rides along the edge of base 12, opposite to track 34. In the exemplary embodiment shown, follower 56 is a channel having a lip to engage opposite sides of the edge of base 12 adjacent track 34. Those skilled in the art will readily understand that various structures can be used for providing a physical engagement, yet sliding relationship between carriage 14 and base 12 via tracks and followers of different types. For example, overlapping lips can be used, allowing carriage 14 to be snap connected on to base 12, yet being slidable along base 12 after being engaged therewith.

Damper 16 is a rotary gear damper having an outer shell or housing 60, which may be multiple components fastened one to another by, for example, ultrasonic welding. Housing 60 defines ribs 62 which, in the exemplary embodiment, surround housing 60 at one end of damper 16. Ribs 62 are fixed elements with respect to housing 60 and can be integral formations in housing 60. Ribs 62 secure damper 16 within well 52 such as by frictional engagement with sides of the well, which may include complementary ridges or ribs to engage ribs 62. Other means and structures also can be used to secure damper 16 to carriage 14, including but not limited to fasteners, snap connectors having components integral with each piece, other types of frictional engagements, and such.

Damper 16 further includes a rotor 64 which is rotatable in housing 60 and includes a damper gear 66 disposed outwardly of housing 60. Damper 16 is a viscous rotary gear damper containing a damping fluid within housing 60 and associated structures of housing 62 and/or rotor 64 to provide resistance to relative rotation between housing 60 and rotor 64. Those skilled in the art will understand readily the nature of and internal structures for the operation of damper 16, which in some applications and uses of the present invention can be either a one-way damper or a two-way damper.

Spring 18 is a constant force spring which forms a coil portion 70 and has a tail portion 72 with a T-shaped distal end 74. The length of tail portion 72 varies as more or less of the overall length of the spring is rolled into or out of coil portion 70. Spring 18 is anchored in base 12 by the engagement of T-shaped distal end 74 in T-shaped spring mount 42 in base 12. It should be understood that other types of spring mounts also can be used to secure an end of the spring, which may be of a shape other than T-shaped to cooperate with the shape of the spring mount. For example, and not limitation, mechanical fasteners such as rivets, screws, bolts and the like can extended through a hole in tail portion 72 and engage base plate 30. Further, slots shaped to cooperatively engage the T-shaped distal end of the spring, or other shapes for the end of the spring also can be used. Spring 18 is held within carriage 14, with coil portion 70 received and contained in a cavity 76 formed in carriage 14. Tail portion 72 is positioned between an outer end of rotor 64 and base plate 30, thereby applying force against damper 16 toward well 52. The length of tail portion 72 can wind into and out of coil portion 70 as carriage 14 is moved along base 12. The use of a constant force spring compensates for build variations in the assembly of the components, and provides consistent spring force through out the operating extent of the assembly. By operating a constant force spring under the damper, between base plate 30 and damper 16, the damper has continuous force applied against it which keeps the damper in an equilibrium position within well 52 so that the damper neither binds nor rattles from being too loose or too tight within the well. The damper assembly therefore operates smoothly.

Figure 7:
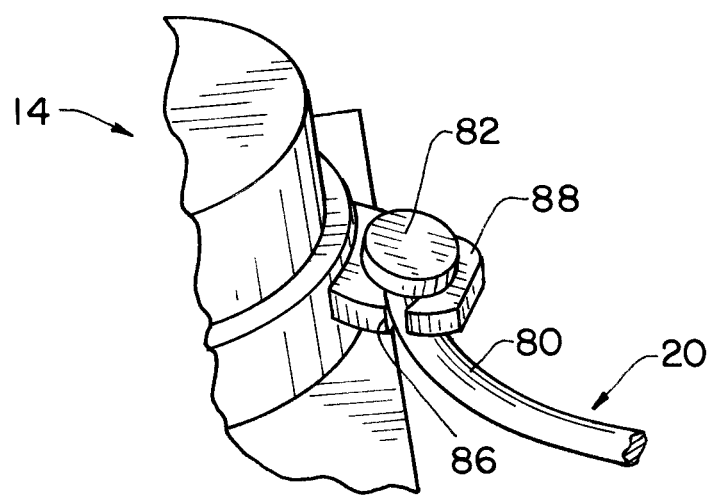
FIG. 7 is a perspective view of an alternate structure for attaching the tether to the damper assembly.

Tether 20 in the exemplary preferred embodiment is composed of a braided polyester strand 80 or other synthetic material with minimal stretch that can be melted or softened and reshaped while maintaining desired strength. An end portion of strand 80 is heated and softened, while forced into a cavity in a mold, to thereby form a heat reshaped, enlarged bulbous end 82 which maintains its enlarged configuration after the heated end is cooled. The heat reshaped bulbous end 82 can be formed as a ball, a disc or other shape depending upon the shape of a heated mold in which the end is compressed, and the type of retaining structure to which tether 20 is to be attached. Formed in this way, as a monolithic structure with a reshaped end, the bulbous end is integral with the tether and therefore not easily separable therefrom. No fastener need be attached nor need the tether be knotted or otherwise manipulated during assembly. The bulbous end 82 can be secured in a keyhole opening 84 in carriage 14 or in a slot 86 in a holder 88 (FIG. 7) integral with or attached to carriage 14. Other types of openings, including holes and slots of various configurations, can be used to capture bulbous end 82. Advantageously, a similar bulbous end 90 can be provided on the opposite end of tether 20 from bulbous end 82, with bulbous end 90 held in a slot 92 of a clip 94 that can be secured to the article to be controlled by damper assembly 10. Clip 94 can be attached by snap connectors, adhesives, fasteners or other suitable means and structures. A similar keyhole opening, slotted holder or other opening can be used to secure bulbous end 90. It should be understood that knotted ends, looped ends secured by clamping rings or other fasteners also can be used at one or both ends of the tether. However, the heat reshaped enlarged ends are preferred.

In the assembled form of damper assembly 10, followers 54, 56 engage base 12 to secure carriage 14 on base 12 while allowing translation of carriage 14 along base 12. Damper 16 is contained between well 52 and tail portion 72, with gear 66 of damper 16 engaged with rack gear 32. Spring 18 is operationally interconnected between base 12 and carriage 14. Tether 20 is connected to carriage 14 and extends along base 12 to guide 40, where it is routed or directed to the item to be controlled, such as, for example, a bin or glove box 100 in the example shown.

Figure 8:
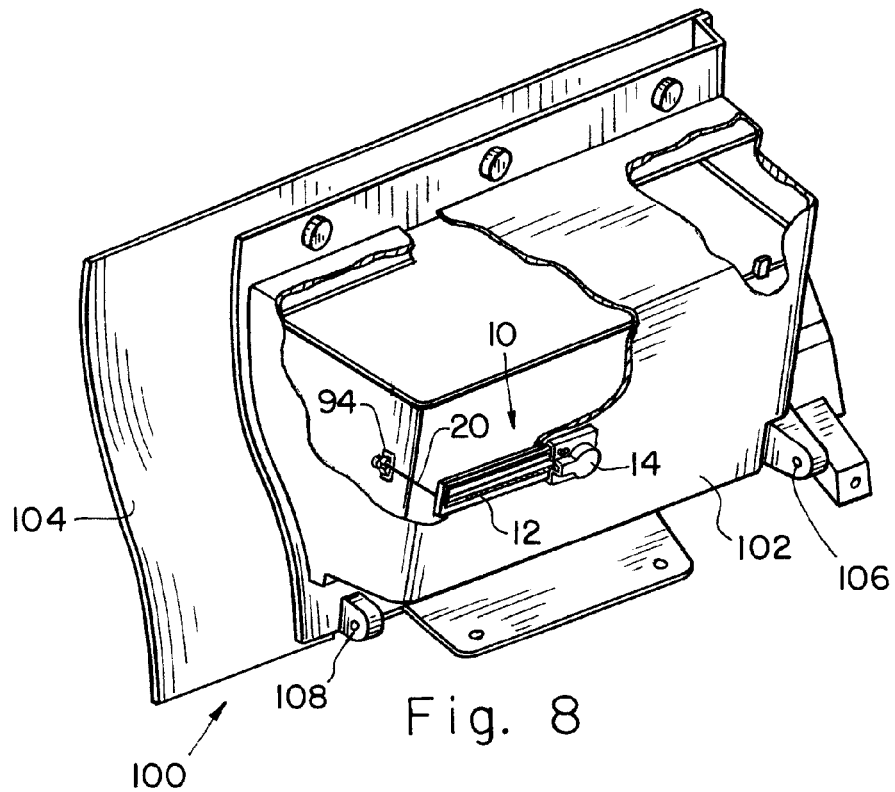
FIG. 8 is a perspective view of an installation of the damper assembly for a storage bin or glove box, showing the storage bin or glove box in a closed position.
Figure 9:
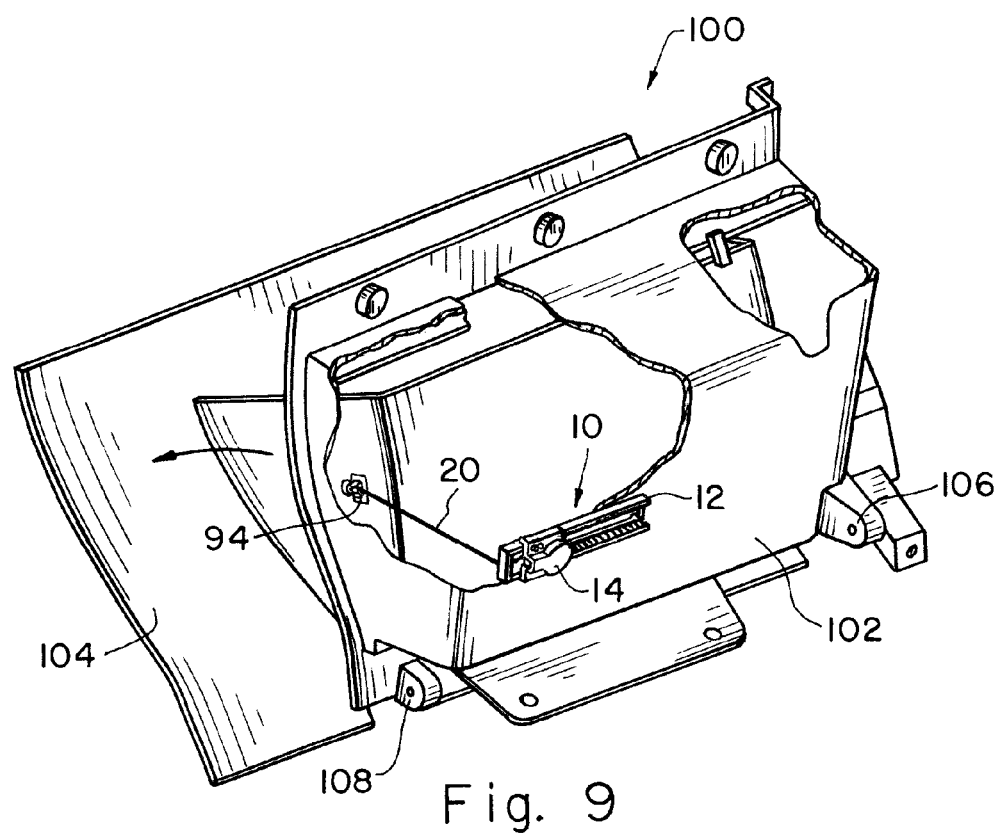
FIG. 9 is a perspective view of the installation of the damper assembly, with the storage bin or glove box shown in an opened position.

In the exemplary installation shown in FIGS. 8 and 9, base 12 is secured to a fixed structure 102 near a movable compartment 104. Clip 94 is secured to compartment 104, and tether 20 is connected to clip 94 and to carriage 14. As movable compartment 104 is opened, tether 20 is pulled by movable compartment 104, in turn pulling on carriage 14 via the connections of tether 20 to both compartment 104 and carriage 14. Carriage 14 moves along base 12. With housing 60 restrained from rotation within well 52, as gear 66 is pulled along rack gear 32, rotor 64 is caused to rotate in housing 60. The damping effect of damper 16 is transmitted to the pivotal movement of compartment 104 about hinge connections 106, 108 via the rotational resistance of rotor 64 in housing 60, which resists rotation of gear 66 and thereby the movement of gear 66 along rack gear 32, which is transferred via tether 20 to compartment 104.

When compartment 104 is moved to close, tension on tether 20 from is released. Spring 18 recoils and pulls carriage 14 in the opposite direction from that described previously. Depending on the nature of damper 16, a damping effect may or may not be applied as the glove box is closed.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A method of manufacturing a damper assembly comprising:
   providing a tether having an end;
   heating the end of the tether;
   reshaping the end of the tether to form a bulbous shaped end;
   engaging the bulbous shaped end with a carriage;
   mounting a damper in the carriage;
   mounting a spring to a base, the spring having a tail portion, the base having a stop; and
   engaging the carriage with the base such that the carriage slides relative to the base and the spring urges the damper and the carriage toward the stop;
   wherein the tail portion applies a force away from the base toward a well of the carriage against an outer end of the damper to urge the damper into the well.

2. The method of claim 1, wherein providing the tether includes providing a braided strand of polyester tether material.

3. The method of claim 1, wherein reshaping the end of the tether includes forming the bulbous shaped end into an enlarged disc.

4. The method of claim 1, further comprising forcing the end of the tether into a cavity in a mold.

5. The method of claim 1, further comprising cooling the end of the tether.

6. The method of claim 1, wherein engaging the carriage with the base includes engaging a follower of the carriage with a track of the base.

7. The method of claim 1, further comprising:
   heating a second end of the tether; and
   reshaping the second end to form a second bulbous shaped end.

8. The method of claim 1, further comprising attaching a second end of the tether to a moveable object controlled by the damper assembly.

9. The method of claim 1, wherein engaging the carriage with the base includes positioning the damper between the tail portion and the carriage.

10. The method of claim 1, wherein engaging the bulbous shaped end with the carriage includes:
    inserting the bulbous shaped end through an opening defined in the carriage; and
    sliding the tether into a slot in communication with the opening such that the bulbous shaped end is stopped against the carriage.

11. The method of claim 1, wherein mounting the spring to the base includes inserting a T-shaped distal end of the spring through a T-shaped spring mount defined by the base.

12. The method of claim 1, wherein:
    the damper is a rotary damper, and
    engaging the carriage with the base includes engaging a gear of the rotary damper with a rack gear of the base.

* * * * *